July 28, 1953
W. MOORE, JR
2,647,252
CONTROL APPARATUS
Filed July 26, 1949
4 Sheets-Sheet 1
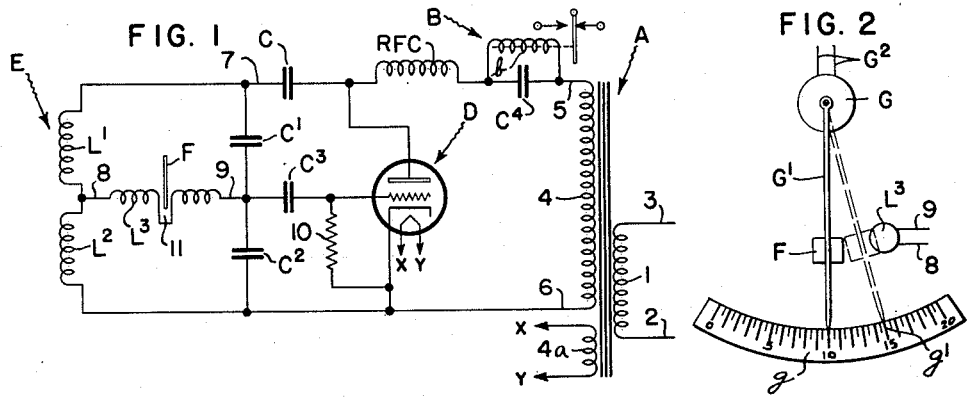
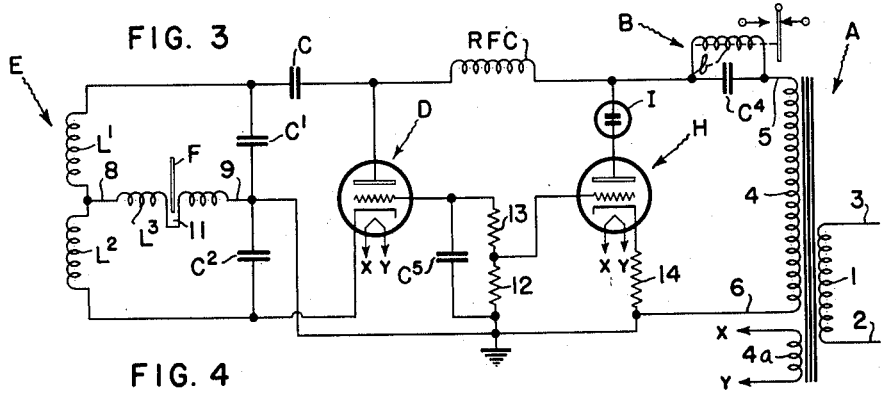
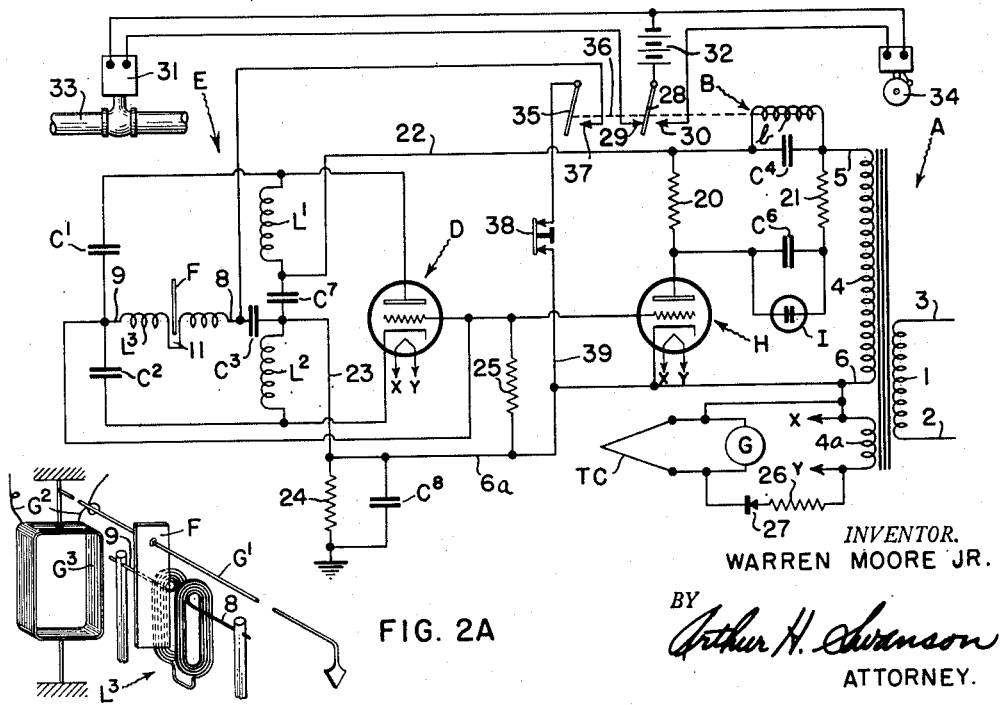
INVENTOR.
WARREN MOORE JR.
BY
Arthur H. Swanson
ATTORNEY.

July 28, 1953  W. MOORE, JR  2,647,252
CONTROL APPARATUS

Filed July 26, 1949  4 Sheets-Sheet 2

*INVENTOR.*
WARREN MOORE JR.

BY *Arthur H. Swanson*

ATTORNEY.

July 28, 1953   W. MOORE, JR   2647,252
CONTROL APPARATUS
Filed July 26, 1949   4 Sheets-Sheet 3

*INVENTOR.*
WARREN MOORE JR.
BY
ATTORNEY.

July 28, 1953  W. MOORE, JR  2,647,252
CONTROL APPARATUS
Filed July 26, 1949  4 Sheets-Sheet 4
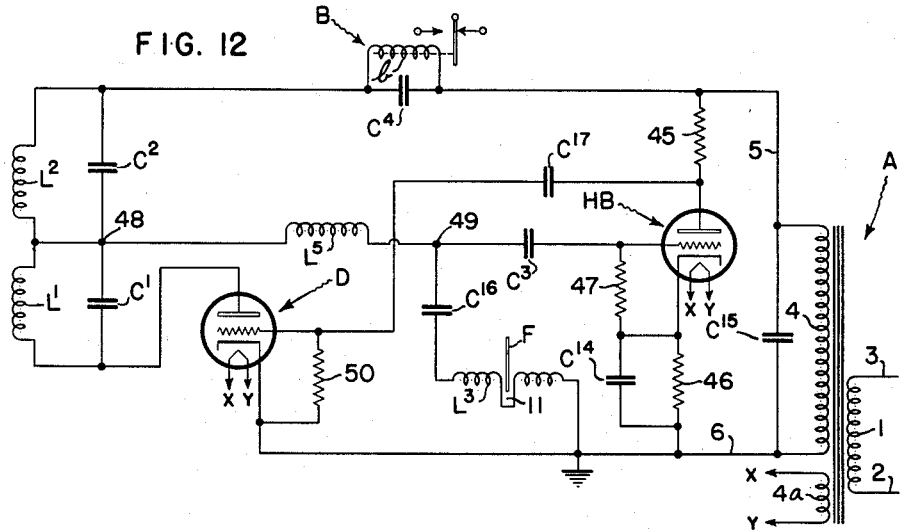
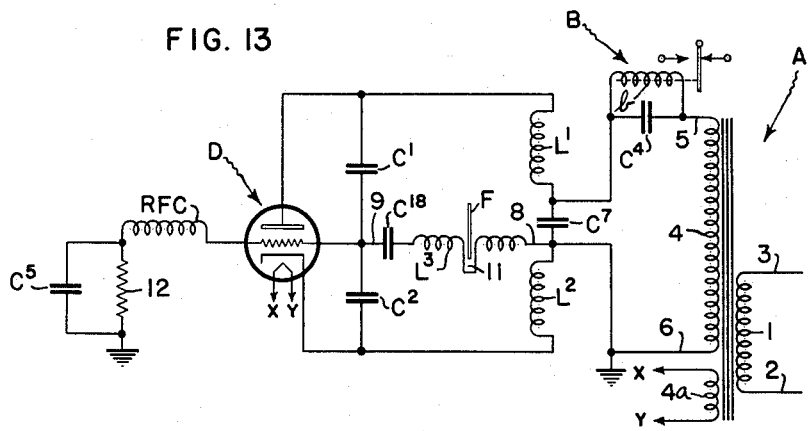
*INVENTOR.*
WARREN MOORE JR.
BY
*Arthur H. Swanson*
ATTORNEY.

Patented July 28, 1953

2,647,252

UNITED STATES PATENT OFFICE 2,647,252

CONTROL APPARATUS

Warren Moore, Jr., Philadelphia, Pa., assignor to Minneapolis-Honeywell Regulator Company, Minneapolis, Minn., a corporation of Delaware Application July 26, 1949, Serial No. 106,796

28 Claims. (Cl. 340—266)

The general object of the present invention is to provide an improved control apparatus including an oscillator and novel means for initiating and interrupting the oscillation of the oscillator in response to variations in a controlling quantity or condition. More specifically stated, the general object of the invention is to provide control apparatus comprising an oscillator circuit including an electronic valve having a control grid and including an adjustable impedance element connected to said control grid in a novel and advantageous manner.

A specific object of the invention is to provide a simple and effective oscillator having novel characteristics of practical importance and especially adapted for use in and as a part of a millivoltmeter-type controller. In the disclosed controller, a control vane is adjusted by the millivoltmeter to vary the reactance and coupling in an oscillator circuit so as to initiate and interrupt the oscillation of the oscillator in response to very small variations in the quantity measured by the millivoltmeter. In a preferred form of the invention, the control vane is carried by the pointer or deflecting element of a galvanometer, and is moved by the deflection of the pointer to vary the reactance of an element included in the oscillator circuit.

The novel vane-controlled oscillator of the present invention also has great utility when employed in connection with apparatus of other than the millivoltmeter type. Thus, said oscillator controller provides advantageous and superior operation when utilized in conjunction with spiral or bellows actuated devices, or with integrating and/or telemetering apparatus.

In practically desirable forms of the invention, the novel oscillator comprises tuned input and output circuits each including a separate fixed inductive element or inductor, and oscillation is initiated and terminated in said oscillator by adjustments of the coupling between said tuned circuits. Said coupling adjustments are effected by movements of a control vane which directly vary the reactance of an adjustable reactive element included in both of the tuned circuits. The last mentioned element may be a variable condenser in some cases, but in certain more desirable forms of the present invention it is preferably a variable inductive element or inductor. In general, the fixed inductive elements of the tuned input and output circuits may or may not be in mutually inductive relation, though such a relation is often desirable.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a diagram illustrating a basic form of the present invention including a vane controlled oscillator of novel form;

Fig. 2 is a somewhat diagrammatic plan view of a millivoltmeter including a deflecting element carrying a control vane;

Fig. 2A is a pictorial view of a portion of a millivoltmeter controller illustrating a preferred form of variable inductor for use in the novel oscillator of the present invention;

Fig. 3 is a diagram illustrating a controller including a vane controlled oscillator, a monitor valve, and a neon signal lamp for indicating the operating condition of the controller;

Fig. 4 is a diagram illustrating a millivoltmeter controller including a monitor valve and neon signal lamp arrangement and other safe failure provisions, and including means adapting the controller for use as an excess temperature or high temperature cut-off device;

Figs. 6, 7, 8, 9, 10, 11, 12 and 13 are circuit diagrams, each of which illustrates a different oscillator circuit arrangement.

Figure 5:
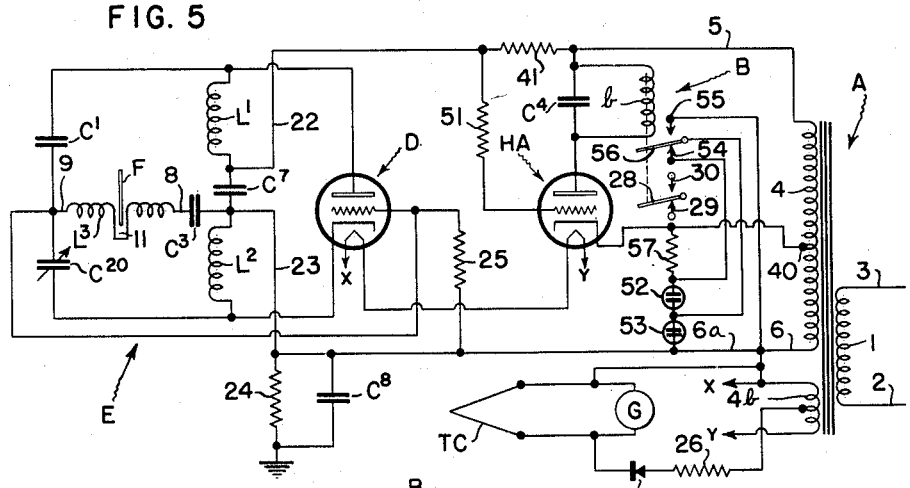
Fig. 5 is a diagram illustrating a desirable form of millivoltmeter controller apparatus including fail-safe provisions and other circuit features not shown in Figs. 1, 3 or 4.

In the basic embodiment of the present invention diagrammatically illustrated in Fig. 1, an energizing transformer A is adapted to have the terminals 2 and 3 of its primary winding 1 connected to alternating current supply conductors, not shown. The secondary winding 4 of the transformer A has one terminal 5 connected through the winding $b$ of an electromagnetic relay B and through a radio frequency choke coil RFC to one terminal of an isolation or blocking condenser C and to the anode of a triode valve D. The cathode of the valve D is connected to the second terminal conductor 6 of the secondary winding 4. The second terminal of the isolation condenser C is connected by a conductor 7 to the terminal 6 through fixed inductive elements or inductors $L^1$ and $L^2$. The connected terminals of the inductors $L^1$ and $L^2$ are connected to one terminal 8 of a variable inductive element or inductor $L^3$. The second terminal 9 of the inductor $L^3$ is connected through a condenser $C^1$ to the conductor 7, is connected through a condenser $C^2$ to the conductor 6, and is connected through a blocking condenser $C^3$ to the control grid of the valve D. The control grid and cathode of the valve D are connected together by a grid resistor 10. The relay winding b is shunted by a condenser $C^4$. The cathode heater of the valve D is energized from a winding $4a$ of the transformer A through partially shown conductors X and Y.

The valve D, the inductors $L^1$, $L^2$ and $L^3$, and the condensers $C^1$, $C^2$ and $C^3$ constitute elements of an oscillator E having tuned input and output circuits in which the variable inductor $L^3$ is a common element. The tuned output circuit of the oscillator can be traced from the anode of the valve D through the blocking condenser C, inductor $L^1$, variable inductor $L^3$, and blocking condenser $C^3$ to the control grid of the valve D. The capacitance of condenser $C^1$, which is connected across the series connected inductors $L^1$ and $L^3$, is of the value required to tune said output circuit to a predetermined frequency.

The tuned input circuit of the oscillator E can be traced from the control grid of the valve D through condenser $C^3$ to the terminal 9, and through the variable inductor $L^3$ and the inductor $L^2$ to the cathode of the valve. The capacitance of the condenser $C^2$, which is connected across the series combination of the second fixed inductor $L^2$ and the variable inductor $L^3$, is preferably of the value required to tune the input circuit of the oscillator to a desired, predetermined frequency, approximately 30 per cent higher than the frequency to which the output circuit is tuned. That frequency may be different for different applications, but, by way of example, it is noted that when the oscillator shown in Fig. 1 is used in a millivoltmeter controller, the output circuit frequency or oscillator operating frequency may well be of the order of 15 megacycles.

Since one end of the transformer winding 4 is connected directly to the anode of the oscillator valve D through the choke RFC, with the second end of the secondary winding 4 connected directly to the cathode of the valve, and since the tuned output circuit of the oscillator is coupled to the anode of the valve D by the condenser C, the oscillator is supplied with plate supply voltage from the winding 4 through a shunt-feed connection. It is obvious, of course, that a source of unidirectional energizing voltage could be used in place of the winding 4 for energizing the oscillator E. Further, since the control grid of the oscillator valve is connected through the previously mentioned condenser $C^3$ to the inductor terminal 9, and hence to both the input and output circuits of the oscillator, the oscillator E is of the common-grid type wherein the control grid of the oscillator valve is the valve element which is common to both the input and output circuits of the oscillator.

It is well to note that, in the oscillator E of the present invention, the condenser $C^3$ acts as a blocking or isolating condenser to allow a negative D. C. bias voltage to be produced across the resistor 10 between the control grid and cathode of the valve D. Insofar as the oscillating signal is concerned, however, the condenser $C^3$ serves as a coupling condenser to connect the control grid of the valve D to the variable inductor $L^3$ at the terminal 9.

The oscillator shown in Fig. 1 is controlled by a vane F. The variable inductor $L^3$ is wound preferably in two sections, which are arranged end to end and are separated by a space 11 into and out of which the vane F may be moved.

The vane F may be formed of aluminum or other good conducting metal, and is arranged parallel to, and movable in the direction of, a plane transverse to the common axis, and between the two sections, of the inductor $L^3$. The two sections of the inductor $L^3$ are close enough together to be in mutual inductive relation when not shielded from one another. When the vane F extends into the space 11, it acts as a shield between the two sections to reduce the inductive effect of each section on the other. Thus the collective self-inductance of the two sections of the inductor $L^3$ is definitely greater when the vane F is out of the space 11 than when the vane extends into said space. The vane F may be adjusted by any sensitive device responsive to a condition such as temperature, pressure, or velocity. In particular, the vane may well be carried by the deflecting arm or pointer $G^1$ of a galvanometer or millivoltmeter G of the type which is shown somewhat diagrammatically in Fig. 2, and which is hereinafter described.

In the apparatus shown in Fig. 1, the values of the different circuit elements included in the oscillator circuit are such that when the vane F is out of the space 11, the inductor $L^3$ provides sufficient regenerative feedback to cause the oscillator to oscillate. When the vane is moved into the space 11, it reduces the self-inductance of the inductor $L^3$ and hence reduces the regenerative feedback provided by the latter sufficiently to interrupt the oscillation.

Heretofore, use has been made of an oscillator circuit which is of the general type and character of that shown in Fig. 1 except that the former arrangement includes no inductive element corresponding to the inductor $L^3$. That oscillator circuit is disclosed and claimed in the copending application of James C. Mouzon bearing Serial No. 18,817, filed April 3, 1948, now Patent No. 2,642,530 of June 16, 1953, and also is disclosed in the copending application of William H. Wannamaker, Jr. bearing Serial No. 694,401, filed August 31, 1946, now Patent No. 2,564,937 of August 21, 1951. Said oscillator has its oscillation initiated and interrupted by movements of a shield or vane, like the vane F, out of and into the space between the adjacent ends of inductors corresponding to inductors $L^1$ and $L^2$, which are arranged close enough to one another to have substantial mutual inductance or coupling when not shielded from one another. In practical use of oscillator circuits of the prior type just described, it has been found possible to interrupt and initiate oscillation by a vane movement toward and away from the common axis of the inductors of the order of .002 inch. I have discovered that a comparably small movement of the vane F into and out of the space 11 between the two sections of the inductor $L^3$ will interrupt and initiate oscillation of a circuit of the type shown in Fig. 1, and that certain practical advantages are obtained by controlling the oscillator by means of a vane associated with the two sections of the inductor $L^3$ instead of with the inductors $L^1$ and $L^2$.

One of said advantages is that, with the arrangement shown in Fig. 1, the terminals 8 and 9 are the only leads necessarily connected to the inductor $L^3$. This is especially advantageous in connection with a millivoltmeter vane controller wherein the variable or control inductor is mounted at the top of the instrument case near the millivoltmeter, while the remainder of the oscillator is mounted in a lower portion of the instrument housing. The need for only two leads to the control coil not only simplifies the wiring of the device, but also gives greater freedom from the effects of stray lead inductances and capacities than can be had with other types of oscillators wherein 3 or even 4 leads must be run to the control inductors. Furthermore, as will be pointed out hereinafter, in other forms of the present oscillator, one of the control inductor terminals can be grounded, thus making it necessary to have only one lead, insofar as stray capacities are concerned, running to the control inductor.

A second advantage of the arrangement shown in Fig. 1 is that the inductor $L^3$ can be small compared to the fixed inductors $L^1$ and $L^2$. In consequence, stray capacities associated with the leads to the variable or control inductor have a much smaller effect than would be produced if the entire inductance of the tuned circuits were located out at the ends of these leads. In other words, the effects of lead length for the leads to the control coil, due to stray lead capacities, in the present oscillator are quite small, whereas lead length of the leads to the inductors in an oscillator of the prior type mentioned above is an extremely critical factor and must be carefully limited. The ability of the present oscillator to tolerate relatively long leads to the control inductor makes this oscillator especially suitable for millivoltmeter use.

A third advantage of the arrangement shown in Fig. 1 is that lateral motion of the vane F, when it is within the space 11, has a much smaller effect on the operation of the oscillator than is experienced with said prior type of oscillator. Thus, when the vane F is so near the critical position between the sections of the inductor $L^3$ that only a minute vane movement of the vane toward said position is required to control the oscillator, random lateral movements of the vane closer to either section of the control inductor do not initiate oscillation nor otherwise affect the oscillator to the extent that such movements affect the oscillation of said prior oscillators, so long as the vane does not move toward or away from said critical position. In a millivoltmeter type of vane controller in which the vane is carried by a deflecting galvanometer pointer, there is considerable opportunity for random sidewise motion of the vane which may not exist in instruments in which the vane is carried directly by a relatively rugged shaft.

When the fixed inductors $L^1$ and $L^2$ of Fig. 1 are not isolated from each other, but are arranged to be mutually inductive and magnetically coupled in a negative or degenerative sense, the operation of the oscillator E will be superior to that obtainable with the apparatus when there is no direct coupling between the fixed inductors. Thus, if it be assumed that the inductance of the control inductance $L^3$ is 0.8 microhenry, and that there is no mutual inductance between the fixed inductors $L^1$ and $L^2$ so that the regenerative coupling or feedback in the circuit will then be produced solely by the inductor $L^3$ and will have a value of 0.8 microhenry, an inductance change in the variable inductor $L^3$ of one per cent will effect a change of one per cent in the total regenerative coupling. If, however, there is also a degenerative magnetic coupling of minus 0.4 microhenry between the two fixed inductors, the net regenerative coupling in the circuit will be but 0.4 microhenry, and a change of one per cent in the inductance of the variable inductor $L^3$ will make a two per cent change in the total regenerative coupling. Thus, with a fixed amount of degenerative magnetic coupling between the two fixed inductors $L^1$ and $L^2$, a given change in the inductance of the variable inductor $L^3$ will produce a greater change in the regenerative coupling of the oscillator circuit than will be produced by the same change in the inductance of the variable inductor for the condition where no direct coupling exists between the fixed inductors.

As previously noted, in Fig. 2 the vane F is attached to the deflecting pointer $G^1$ of a millivoltmeter G for movement into and out of the space 11 between the sections of the coil $L^3$, on predetermined changes in the value of the quantity to be measured by said meter and applied to the meter terminals $G^2$.

As shown in Fig. 2, the pointer $G^1$ of the meter G is arranged to deflect about a vertical axis and to move the vane in a horizontal plane into and out of the space 11 between the two vertically aligned sections of the coil $L^3$. The latter may well be adjustable about the axis of the deflection of the pointer $G^1$ so as to vary the control point position into and out of which the pointer moves to initiate and terminate oscillation. As diagrammatically shown in Fig. 2, the pointer $G^1$ deflects along a scale $g$, and the point $g'$ on this scale identifies the critical control point position of the pointer $G^1$. In practice the extent of movement of the vane F to initiate and interrupt oscillation of the oscillator need not exceed 0.002 of an inch.

In apparatus in which the conductors or terminals 8 and 9 connected to the variable inductor $L^3$ must necessarily be relatively long, it may be found that the self-inductance associated with those conductors will be sufficient to cause the vane F to lose its control of the oscillation, unless sufficient degenerative coupling is provided. By providing sufficient fixed degenerative coupling between the inductors $L^1$ and $L^2$, however, the uncontrollable regenerative effect of the conductors associated with the inductor $L^3$ can be compensated for, and at the same time, the above mentioned increased change in the regenerative coupling of the oscillator circuit produced by a given change in the inductance of the variable inductor is produced. This latter effect results in increased sensitivity.

In the operation of the apparatus shown in Fig. 1, the oscillator E oscillates at the predetermined frequency when the vane F is not in its critical position in the space 11 between the sections of the inductor $L^3$. Under this condition, a negative D. C. bias voltage is produced and maintained across the grid bias resistor 10, said grid bias voltage having the magnitude required to maintain the control grid of the valve D sufficiently negative with respect to the associated cathode so as to limit the anode current passed by the valve D to a value which is below that necessary to cause the relay B to pick up and close its normally open contacts.

When the vane F passes into the critical position between the sections of the inductor $L^3$, in which position the regenerative feedback produced by that inductor is reduced below the value required to maintain the circuit in oscillation, the oscillation ceases, the grid bias voltage produced across the resistor 10 is substantially reduced, and the anode current passed by the valve D is increased to a value at which the relay B is caused to pick up and close its normally open contacts. Subsequent movement of the vane F out of the critical position causes the relay B to return to the dropped out position.

The general principles of the invention illustrated diagrammatically in Fig. 1 may be used in apparatus employed for different purposes and of various forms, some of which are illustrated and described herein. Circuit elements used in two or more of the figures hereof and which do not differ significantly in their use in the various circuits are ordinarily designated by the same reference symbols.

In the millivoltmeter controller portion shown in Fig. 2A, the vane F is mounted on the galvanometer pointer $G^1$ which, in turn, is carried by the coil $G^3$ of the galvanometer G. Fig. 2A illustrates a preferred form which the variable inductor $L^3$ may take. As shown, each section of the inductor $L^3$ is wound in the form of an elongated spiral having parallel sides over a substantial portion of its length, and being mounted with its longer dimension in the vertical direction. The vane F is so carried by the galvanometer pointer $G^1$ as to extend vertically downward in a plane parallel to and midway between the planes of the two sections. The vertical edge of the vane adjacent the inductor sections is substantially parallel with the aforementioned parallel sides of the inductor sections.

With the construction and arrangement of Fig. 2A, the control of the state of oscillation of the oscillator E is made more abrupt for a given movement of the vane F relative to the inductor sections than is obtainable when circular spiral inductor sections as shown in Fig. 2 are employed.

Fig. 3 illustrates a circuit arrangement for a millivoltmeter controller which includes a monitor circuit. The latter includes a monitor triode valve H and a neon signal lamp I. The valve H and lamp I are connected in series with one another and with the relay winding b between the terminals 5 and 6 of the secondary winding 4 of the transformer A. In Fig. 3, the anode of the oscillator valve D is connected to the monitor circuit and to the relay winding b through a radio frequency choke coil RFC. The control grid of the valve D is connected to the grounded terminal 6 by series connected grid resistors 12 and 13. The control grid of the valve H is connected to terminal 6 through the resistor 12. The series connected resistors 12 and 13 are shunted by a condenser $C^5$. The cathode of the valve H is connected to the terminal 6 through a cathode resistor 14, and the anode of the valve H is connected to the transformer terminal 5 through the neon lamp I and the relay winding b with which the condenser $C^4$ is connected in parallel.

The tuned output circuit of the oscillator shown in Fig. 3 can be traced through a circuit path including the anode of the valve D, the condenser C, fixed inductor $L^1$, and variable inductor $L^3$ through which the inductor $L^1$ is connected to ground, to the control grid of the valve D, and to the transformer terminal 6. The tuned input circuit of the oscillator E of Fig. 3 can be traced from the cathode of the valve D through the fixed inductor $L^2$ and variable inductor $L^3$ to ground and to the control grid of the valve D. The tuned output circuit can be tuned to a predetermined frequency by the condenser $C^1$, and the tuned input circuit can be tuned to a predetermined frequency, preferably about thirty percent higher than the frequency of the tuned output circuit, by the condenser $C^2$. As already indicated, the control grid of the oscillator triode D is grounded through a parallel connected resistance and capacity network. The oscillator of Fig. 3 is thus of the aforementioned common-grid type and includes a "grounded" or "fixed potential" control grid whereby the potential between the oscillator valve cathode and ground is varied by the oscillating signal.

The oscillator shown in Fig. 3 has the three important advantages noted above as characteristic of the oscillator shown in Fig. 1, and has the additional advantage that the variable inductor $L^3$ has one terminal or lead, 9, grounded.

When the oscillation of the valve D of Fig. 3 is interrupted, the negative D. C. grid-cathode voltage produced across the resistors 12 and 12, when the valve D is oscillating, disappears, and consequently the anode current through the valve is substantially increased. This results in an increase in the current flow through the relay winding b, thus energizing the relay B. If the vane F is moved into the space 11 to thus effect the energization of the relay B on an increase in a furnace temperature controlled through the contacts of the relay B, the control circuit controlled by the relay contacts obviously must be of such character that the energization of the relay will cut off or decrease the furnace fuel supply or otherwise reduce the rate at which heat is supplied to the furnace. A controller of the type shown in Fig. 3 which operates to reduce the rate of heat supplied to the furnace to prevent overheating of the furnace or work, by energizing a relay, is sometimes referred to as a "forward" type controller, to distinguish it from a "reverse" type controller which reduces the furnace rate of heating by deenergizing a previously energized relay.

A "forward" type controller has the inherent unsafe-failure characteristic that some defect in the oscillator circuit may prevent the relay from becoming energized and the controller from reducing the furnace heat supply when a rise in the furnace temperature makes such reduction necessary. The monitor circuit of Fig. 3 provides some compensation for this unsafe-failure characteristic of "forward" circuits by causing the neon lamp to indicate different operating conditions of the oscillator circuit. Thus, when the oscillator circuit of Fig. 3 is in normal condition, the lamp I will flicker continuously while the measured temperature is below its cut-off or set point value, and when the oscillator ceases to oscillate, the lamp I ceases to flicker and either burns steadily or is extinguished, according to the condition of the oscillator. Thus, for example, a burn-out of the cathode heater of the triode D will interrupt the oscillation of the oscillator and will cause the neon lamp to burn steadily. A defect in the monitor circuit such as that due to the burn-out of the cathode heater for the valve H will cause the neon lamp to be extinguished and thus indicate that the apparatus is defective.

The flickering of the neon lamp when the oscillator circuit is oscillating, is directly due to the action of the RC circuit including the grid resistors 12 and 13 and condenser $C^5$. The time constant of that circuit is so chosen that the oscillation of the oscillator is interrupted at a rate of a few times per second. This low frequency interruption of the oscillating action is caused by the periodic charging and discharging of the condenser $C^5$. When the oscillator is oscillating, the periodic interruption of the oscillating action causes a varying bias to be applied to the control grid of the monitor triode H and thereby causes the neon bulb I to flicker. This flickering of the neon bulb I indicates that the oscillator is oscillating properly, and is operative to control the energization and deenergization of the relay B. The valves D and H of Fig. 3 may be the two valves of a twin triode miniature tube of the commercially available 12AU7 type.

Fig. 4 represents a desirable form of the invention for use as an excess or high temperature cut-off controller, adapted, when the control temperature attains a predetermined maximum value, to cut off or substantially reduce the heat supply to the furnace and thereby terminate a heating operation. Preparatory to another heating operation, a manual readjustment of the apparatus must be effected before the supply of heat previously cut off or reduced can be restored or increased.

The circuit arrangement shown in Fig. 4 includes a monitor circuit which includes a monitor valve H, but is different in other respects from the monitor circuit of Fig. 3 and has a different mode of operation as is hereinafter explained. The monitor valve H of Fig. 4 has its cathode directly connected to an instrument ground bus $6a$ to which the transformer secondary winding terminal 6 is connected. The anode of the monitor valve H is connected to the transformer terminal 5 through a resistor 20 and the winding $b$ of the relay B and the condenser $C^4$ in shunt thereto. Connected across the series combination of the relay coil $b$ and resistor 20 is a relaxation oscillator circuit including a resistor 21, a neon glow lamp I and a condenser $C^6$. The control grid of the monitor tube H is directly connected to the control grid of the oscillator valve D. As those skilled in the art will understand, the monitor relaxation oscillator circuit may be connected across the resistor 20 only, if desired.

As shown, the condenser $C^3$, which in Fig. 1 directly connects the control grid to the condensers $C^1$ and $C^2$, is directly connected in Fig. 4 between the end terminal 8 of the variable inductor $L^3$ and the ground bus $6a$. This Fig. 4 mode of connecting the condenser $C^3$ in the circuit network simplifies the wiring from the mechanical standpoint, but does not modify the operative purpose or function of the condenser $C^3$, which is to serve as a bypass condenser for the high frequency oscillator signal around the resistor 25, while permitting a D. C. bias voltage to be developed across resistor 25.

The oscillator circuit of Fig. 4 differs from the oscillator circuits of Figs. 1 and 3 in various ways. For one thing, the fixed inductor $L^1$ has one end connected through a condenser $C^7$ to one end of the inductor $L^2$. The connected terminals of the inductor $L^1$ and condenser $C^7$ are connected by a conductor 22 to relay winding $b$ and its shunt condenser $C^4$, and are connected through said winding and condenser to the terminal 5 of the transformer winding 4. The winding 4 is thus connected in series with the relay winding $b$ and its shunt condenser $C^4$ across the condenser $C^7$, since the ground bus $6a$, which is directly connected to the transformer terminal 6, is connected by a conductor 23 to the terminal of the condenser $C^7$ connected through the condenser $C^3$ to the terminal 8 of the inductor $L^3$. The ground bus $6a$ of the control instrument, as shown, is connected to ground through an external ground connection comprising a resistor 24 and a condenser $C^8$ in parallel therewith. The control grids of the valves D and H are connected to the ground bus $6a$ by a resistor 25. In Fig. 4 the inductors $L^1$ and $L^2$ are arranged in inductive relation to provide a degenerative feedback substantially neutralizing or overbalancing the extraneous regenerative feedback produced by the inductance of the leads associated with the variable inductor $L^3$. In Fig. 4, anode voltage is supplied to the valve D from the terminal 5 of the transformer secondary winding 4 through the conductor 22 and the inductor $L^1$. Thus the oscillator of Fig. 4 is series fed and not shunt fed, as are the oscillator circuits of Figs. 1 and 3, in each of which the anode of the valve D is connected to the inductor $L^1$ through the condenser C.

As diagrammatically shown the control galvanometer G which adjusts the vane F, is responsive to the voltage of a furnace thermocouple TC and is connected in parallel with said thermocouple across the terminals of a secondary winding $4a$ of the transformer A which supplies current to the cathode heaters of the valves D and H. As shown, one terminal of the transformer winding $4a$ is directly connected to one terminal of the galvanometer and to one terminal of the thermocouple TC, and to the ground bus conductor $6a$. The second terminal of the secondary winding $4a$ is connected to the second terminals of the galvanometer and thermocouple through a resistor 26 and a rectifier 27 in series. The rectifier 27 may be a copper oxide rectifier. As explained later, the circuit connections including the galvanometer, thermocouple TC, resistor 26 and rectifier 27, form a thermocouple burnout safety circuit.

In the use of the relay B in a high temperature cut-off device as illustrated diagrammatically in Fig. 4, the relay B includes a movable contact 28 biased for engagement with a stationary contact 29. When the relay B is energized, the contact 28 is moved out of engagement with the stationary contact 29 and into engagement with a second stationary contact 30. When the oscillator is oscillating and the relay B is deenergized, the contacts 28 and 29 then in engagement, close an energizing circuit for an electromagnetic valve 31 which is then energized by current supplied by a source 32. The valve 31 when energized permits fuel to pass to the controlled furnace (not shown) through a fuel supply pipe 33. When as a result of a rise in the temperature of said furnace, the galvanometer G moves the vane F into the space 11, and thus reduces the self-inductance of the inductor $L^3$, the contact 28 is moved out of engagement with the contact 29 and into engagement with the contact 30. The separation of the contacts 28 and 29 opens the energizing circuit for the valve 31 and thus interrupts the passage of fuel to the furnace through the pipe 33. The engagement of the contact 28 with the contact 30 closes an alarm circuit, which as diagrammatically shown, includes an alarm bell 34 and the current source 32.

Fig. 4 diagrammatically illustrates circuit provisions which may be employed to maintain the contact 28 in engagement with the contact 30 following the energization of the relay B at the end of one heating operation until the apparatus is manually readjusted to initiate another heating operation, regardless of whether or not the vane is subsequently withdrawn from between the sections of the inductor $L^3$. The means diagrammatically shown to thus maintain the contact 28 in engagement with the contact 30 comprises a movable contact 35 connected by a link 36 to the contact 28 for movement with the latter. The contact 35 is in engagement with a stationary contact 37 when the contact 28 is in engagement with the contact 30, but separates from the contact 37 when the contact 28 is moved out of engagement with the contact 30. The contact 37 is connected to the terminal 8 of the inductor L³, and thence to the control grids of the valves D and H through the inductor L³. The contact 35 is normally connected to the ground bus 6a through a normally closed switch 38 and conductor 39. With the described arrangement, when the contact 28 is moved into engagement with the contact 30, the contact 35 engages the contact 37 and thus connects the grids of the valves D and H to the grounded bus 6a. This creates a condition which maintains the energization of the relay B until the switch 38 is manually opened.

In the contemplated normal operation of the apparatus shown in Fig. 4, when the measured temperature is below a predetermined cut-off or set point value, the galvanometer G maintains the vane F out of the space 11 between the two sections of the variable inductor L³, and the oscillator including the valve D is in a state of oscillation. In consequence, a negative self-bias voltage is then developed across the resistor 25 which prevents the valve D from drawing sufficient anode current operatively to energize the relay winding b and to draw the movable relay contact 28 into engagement with the relay contact 30 from which the contact 28 is normally separated. While the contacts 28 and 29 are in engagement, the electromagnetic valve 31 is energized and fuel is supplied to the controlled furnace. The negative self bias voltage across the resistor 25 also prevents the valve H from drawing enough current through the resistor 20 to result in a voltage across the resistor 21 and condenser C⁶ sufficient to fire the glow lamp I.

When the measured temperature rises to or above its predetermined cut-off value, the vane F will move into the space 11 and reduce the self-inductance of the inductor L³ sufficiently to interrupt oscillation. When this occurs, the negative self-bias voltage of the control grid of the valve D is substantially eliminated, and the current flow through the valve D increases to cause the relay contact 28 to pull into engagement with the contact 30 and to cause the monitor tube H to draw enough anode current to thereby produce a voltage drop across the resistor 20 sufficiently large to actuate the relaxation oscillator circuit, and thereby to cause the neon lamp I to flash periodically. The frequency with which the neon lamp I then flashes is determined by the time constant of the resistor 21 and condenser C⁶ and by the magnitude of the voltage drop across the relay coil b and resistor 20.

The monitor arrangement of Fig. 4 which causes the neon lamp I to produce a flashing signal only after the cut-off temperature is reached, is preferred to the arrangement shown in Fig. 3 in which the neon lamp flashes only when the measured temperature is below its cut-off value. With the Fig. 4 arrangement, the flashing signal is produced only when the cut-off temperature is reached or exceeded, or upon failure of any component of the apparatus which causes a sensible increase in the conductivity of the monitor valve H.

As previously indicated, the circuit provisions shown in Fig. 4 through which the galvanometer G and thermocouple TC are associated with the transformer winding 4a form a thermocouple burnout safety device. That device is operative to cause the galvanometer pointer to swing upscale and thus cause energization of the cut-off relay B in the event that the associated thermocouple TC burns out or is otherwise open-circuited. When the thermocouple is intact, its normally low resistance shunts from the galvanometer most of the rectified current from the transformer winding 4a, and thus produces only a small tendency to shift in the galvanometer reading. That tendency may be compensated for in the usual manner. However, when the thermocouple is open-circuited, all of the rectified current flows through the galvanometer and causes the latter to drive upscale and actuate the cut-off relay.

The connection of the ground bus 6a to ground through the resistor 24 and condenser C⁸ prevents the galvanometer from being affected by stray voltages which might otherwise so disturb the operation of the apparatus if the ground bus 6a were connected directly to ground. If the ground bus 6a were directly connected to ground in an electric furnace installation, for example, the flow of stray alternating currents in the hot walls of the furnace and the rectifying action of the hot walls might cause a direct current to flow from the wall through the thermocouple and ground bus and through the external ground connection. Such a direct current flow through the thermocouple would result in erratic measuring inaccuracies. The resistor 24 isolates the ground bus 6a from the true ground for direct current flows and thus reduces any stray voltage drop across the thermocouple to an insignificant amount. The chassis upon which the apparatus of Fig. 4 may be mounted may be connected directly to ground in the usual manner.

In practice, an excess temperature controller such as is shown in Fig. 4 is ordinarily used for the primary purpose of preventing the controlled furnace or the work therein from being injuriously overheated, while an associated furnace controller, such as a millivoltmeter controller like that shown in Fig. 3 or in Fig. 5, subjects the furnace to on-off or proportional control. In consequence, a failure of the excess temperature controller which would leave the fuel valve 31 of Fig. 4 wide open would ordinarily be prevented from overheating the furnace by the action of the associated furnace controller. In the excess temperature controller shown in Figure 4, the monitor valve H serves mainly to control the neon lamp I, although the anode current of the valve H does supplement the action of the anode current of the oscillator valve D in pulling in the relay contact 28. The circuit of Fig. 4 will ordinarily be so designed that the anode current of the oscillator valve D will be sufficient to pull in the relay contact 28 in the event that the monitor valve H fails. Similarly, the circuit is preferably so designed that the current drawn by the valve H will produce a sufficient voltage drop to cause operation of the neon lamp I in the event that the oscillator valve D fails and ceases to draw anode current. With the valve H normally providing a portion of the current required to pull in the relay contact 28, as it does in the Fig. 4 arrangement, the load on the oscillator valve D is reduced and the life of that valve is correspondingly prolonged.

The values of the circuit elements shown in Fig. 4 may vary widely in different installations, but in each installation the values of the different elements should be suitably related. By way of illustration and example, and not by way of limitation, it is noted that one set of related values for the Fig. 4 elements is as follows:

| | |
|---|---|
| Resistor 20 | 39,000 ohms |
| Resistor 21 | 1.0 megohm |
| Resistor 24 | 100,000 ohms |
| Resistor 25 | 6.9 megohms |
| Resistor 26 | 8,000–32,000 ohms |
| Condenser $C^1$ | 25 micromicrofarads |
| Condenser $C^2$ | 10 micromicrofarads |
| Condenser $C^3$ | 0.02 microfarad |
| Condenser $C^4$ | 10.0 microfarads |
| Condenser $C^6$ | 1.0 microfarad |
| Condenser $C^7$ | 0.005 microfarad |
| Condenser $C^8$ | 0.1 microfarad |
| Inductor $L^1$ | 2.0 microhenries |
| Inductor $L^2$ | 2.0 microhenries |
| Inductor $L^3$ | 0.5–1.0 microhenry (including leads) |

The degenerative coupling between inductors $L^1$ and $L^2$ may be approximately 0.5 microhenry.

The valves D and H may each be one of the valves of the commercially available type 12AU7 twin tube. The voltage of the secondary windings 4 and 4a may well be 220 volts and 6.3 volts, respectively.

Fig. 5 illustrates a millivoltmeter controller differing from the controller shown in Fig. 3 in important respects. In particular, the controller shown in Fig. 5 is of the "reverse" type, and includes the series fed oscillator and thermocouple burnout features of the controller shown in Fig. 4. In Fig. 5, the relay B is directly controlled through a repeater stage triode valve HA which is directly coupled to the oscillator valve D. The valves D and HA and the relay B are so relatively arranged that when the valve D is oscillating the valve HA is sufficiently conductive to maintain the energization of the relay B, and when a variation in the controlling temperature or other force prevents oscillation of the oscillator, the valve HA ceases to maintain the energization of the relay B. In respect to the oscillator circuit and its connection to the transformer secondary winding 4, and in respect to the thermocouple burnout circuit features, there is no difference between the circuit arrangements shown in Figs. 4 and 5, except that the transformer terminal 5 is connected to the inductor $L^1$ and through the latter to the anode of the valve D, through an anode resistor 41 instead of through the relay coil b and condenser $C^4$.

In Fig. 5, the relay winding b and condenser $C^4$ are connected between the anode of the triode HA and transformer terminal 5. The cathode of the triode HA is connected to the transformer winding 4 at a point 40 at which the potential differs from the potential of the terminal 6, during the half cycles in which the triode HA is conductive, by an amount substantially smaller than the full potential across the winding 4. If the maximum voltage across the winding 4 is 220 volts, the maximum voltage across the portion of the winding 4 between the point 40 and terminal 6 may well be 105 volts. The control grid of the valve HA is connected to the anode of said valve through a resistor 51, resistor 41, and relay winding b. As shown, the cathode heaters of the valves D and HA of Fig. 5 are connected in series across the terminals of the transformer secondary winding 4b.

In the operation of the apparatus shown in Fig. 5 to control the heating of a furnace, for example, when the furnace temperature or other control force, is below normal, the vane F is out of the space 11 between the two sections of the variable inductor $L^3$ and the oscillator E is in its oscillating condition. In consequence, the current flow through the resistor 41 is then relatively small and the positive potential of the control grid of the valve HA is sufficiently high relative to the potential of the cathode of the valve HA, to make the valve HA fully conductive so that its output current energizes the relay B and thereby supplies heat to the furnace as required to raise its temperature.

On an increase in the control temperature which causes the vane F to enter the space 11, the resultant decrease in self-inductance of the inductor $L^3$ interrupts oscillation of the oscillator E and thereby causes the valve D to draw substantially more current through the resistor 41 than it did in the oscillating condition of the oscillator. The effect of the resultant increase in the potential drop across the resistor 41 is to make the potential of the control grid of the valve HA less positive or even negative relative to the cathode potential, and thereby make the valve HA insufficiently conductive to maintain the energization of the relay B whereupon the supply of heat to the furnace is cut off or reduced. When the temperature of the furnace thereafter falls below its predetermined normal value, the vane F moves out of the space 11, the oscillator begins to oscillate and the current flow through the resistor 41 decreases with the result of increasing the output current of the valve HA and reenergizing the relay B.

In consequence of the series connection of the cathode heaters of the valves D and HA of Fig. 5, the failure of the oscillating valve D due to the burnout of its cathode heater, will have the effect of deenergizing the control valve HA with a resultant safe-failure reduction in, or interruption of the heat supply to the furnace.

In Fig. 5, the input circuit tuning condenser $C^{20}$ is advantageously made variable between values of 3 and 12 micromicrofarads, to permit a ready sensitive tuning adjustment of the tuned input circuit.

In Fig. 5, the transformer secondary winding 4b is adapted to supply a voltage of 12.6 volts to the series connected cathode heaters of the valves D and HA which are connected in series with the secondary winding 4b to provide safe failure in the event of a burnout of either heater. The winding 4b is provided with a center tap connection which is connected through the resistor 26 and rectifier 27 to the corresponding terminals of the thermocouple TC and galvanometer G. In consequence, the thermocouple burnout circuit of Fig. 5 is supplied with an energizing voltage of 6.3 volts when the thermocouple TC burns out. Except as hereinbefore noted, the circuit elements of the controller shown in Fig. 5, may well have the values hereinbefore given by way of example for the circuit elements shown in Fig. 4.

For the purpose of visually indicating the energized and non-energized conditions of the relay B, and thereby the oscillating and non-oscillating operating conditions of the oscillator E, there are provided a pair of neon signal lamps 52 and 53 and relay contacts 54, 55 and 56, which are additional to control circuit contacts 28, 29 and 30, and which selectively close an energizing circuit to the lamp 52 or 53 as the relay B is energized or deenergized. To this end, the lamps 52 and 53 are connected in series with a resistor 57 between the ground bus 6a and the transformer point 40. The relay contact 55 is connected to the ground bus 6a while the contact 56 is connected to the terminal joining the lamps 52 and 53. The contact 54 is connected to the junction of the lamp 52 and resistor 57. With this arrangement, it is apparent that when the relay B is energized, the closure of the contacts 55 and 56 serves to shunt out the signal lamp 53 as a result of which the full voltage of the transformer winding 4 between the point 40 and the terminal 6 is applied across the resistor 57 and lamp 52. Conversely, when the relay B is deenergized, the closure of the contacts 56 and 54 shunts out the signal lamp 52 and the transformer voltage between the point 40 and terminal 6 on the winding 4 is applied across the resistor 57 and lamp 53.

In the arrangement of Fig. 5 just described, the values of the circuit elements not included in the Fig. 4 arrangement may be as follows:

|  | Ohms |
| --- | --- |
| Resistor 41 | 18,000 |
| Resistor 51 | 39,000 |
| Resistor 57 | 100,000 |

The oscillators shown in Fig. 5 and also in Figs. 1 and 3 are especially suitable for millivoltmeter control purposes. Each of these oscillators may be operated at a relatively high frequency of or above approximately 15 megacycles. With such high frequency operation, the force exerted on the vane F and thereby on the delicate galvanometer pointer by the oscillating current flow in the inductor $L^3$ is so small as to be negligible for all practical purposes. That is to say, the force or drag exerted on the vane F by the oscillating current flow in the inductor $L^3$ is much greater for relatively low frequencies of oscillating current than for relatively high frequencies, and only a relatively small force or drag on the vane of a millivoltmeter controller can be tolerated, because of the small pointer deflecting torque of the galvanometer of such a controller. A further advantage of vane controlled oscillators operating at relatively high frequencies, is that the inductors including the inductor $L^3$ of such oscillators ordinarily may be substantially smaller than the corresponding inductors of controllers operating at relatively low frequencies.

Figure 6:
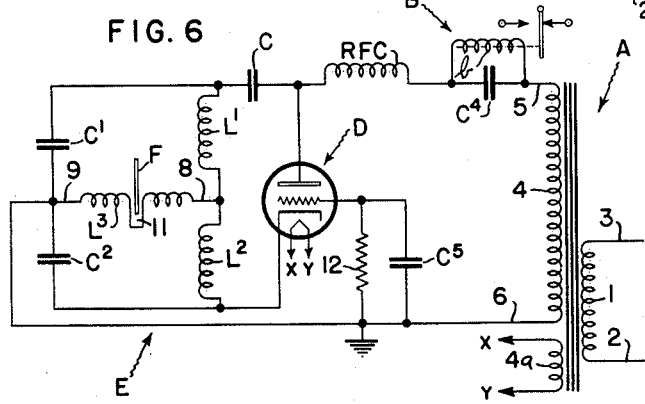

Fig. 6 illustrates a reverse operating controller including an oscillator circuit which in form is much like that of Fig. 3, except that it includes nothing corresponding to the monitor circuit of Fig. 3. However, the oscillator circuit of Fig. 6 differs structurally and operatively from the oscillator circuit of Fig. 3 in that its fixed inductors $L^1$ and $L^2$ are physically coupled to provide a regenerative feed-back of such magnitude that oscillation will occur only when the vane F extends into the space 11 between the halves of the variable inductor $L^3$ and reduces the inductance of said inductor. The oscillator of Fig. 6 ceases to oscillate when the vane is moved out of the space 11. When the controller of Fig. 6 is used to vary the supply of heat to a furnace as required to maintain an approximately constant furnace temperature, the relay B is arranged to cut off or reduce the supply of heat when deenergized, and to restore or increase the supply of heat only when the relay is energized. The reverse operation of the oscillator shown in Fig. 6 requires that the plate or output circuit of the oscillator be tuned to a frequency which is approximately thirty percent higher than the frequency to which the input circuit of Fig. 6 is tuned.

Figure 7:
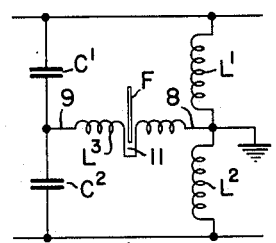

Fig. 7 illustrates a modification of the reverse acting controller of Fig. 6, in which the terminal 8 of the variable inductor $L^3$ is connected to ground, whereas in Fig. 6, the terminal 9 is connected to ground.

The oscillators shown in Figs. 6 and 7 are also of the common grid type, wherein the potential of the control grid of the oscillator valve is fixed relative to ground, insofar as that valve is concerned, and wherein it is the cathode potential of said valve which is varied relative to that of the grid by the oscillating signal.

A reversely operating controller has an advantage for use as a millivoltmeter controller in that its failure ordinarily leaves the associated relay B deenergized and the supply of heat shut off, whereas the failure of a forwardly operating controller may leave the relay deenergized and the heat turned on.

Figure 8:
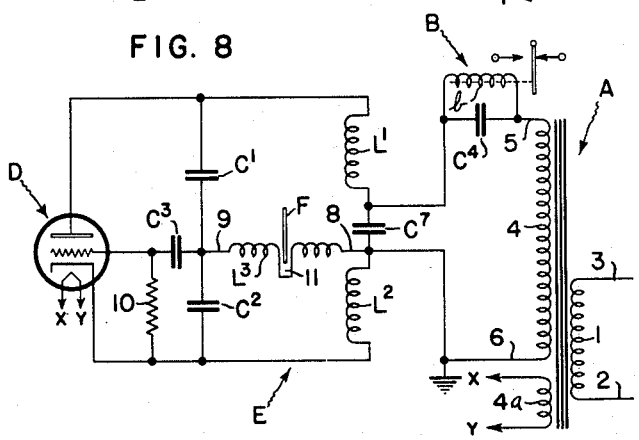

Fig. 8 diagrammatically illustrates a series fed controller generally like the controller shown in Fig. 1, except in respect to the manner in which the terminals of the transformer secondary winding 4 are connected to the oscillator valve D. In Fig. 8, the transformer terminals 5 and 6 are connected across a condenser $C^7$ through the parallel connected relay winding $b$ and condenser $C^4$. Condenser $C^7$ is interposed as in Figs. 4 and 5 between the fixed inductor $L^1$ and the point at which the fixed inductor $L^2$ is connected to the terminal 8 of the variable inductor $L^3$. In Fig. 8, the junction of the terminal 8 and inductor $L^2$ is directly connected to ground. If separate ground connections to the inductor $L^2$ and terminal 8 are provided, said terminal need not extend from the inductor $L^3$ to the oscillator E proper, which will be advantageous in some cases. Such elongation of the terminal 8 as may be needed to provide a direct ground connection to the inductor $L^3$ will not give rise to undesirable capacity effects.

Figure 9:
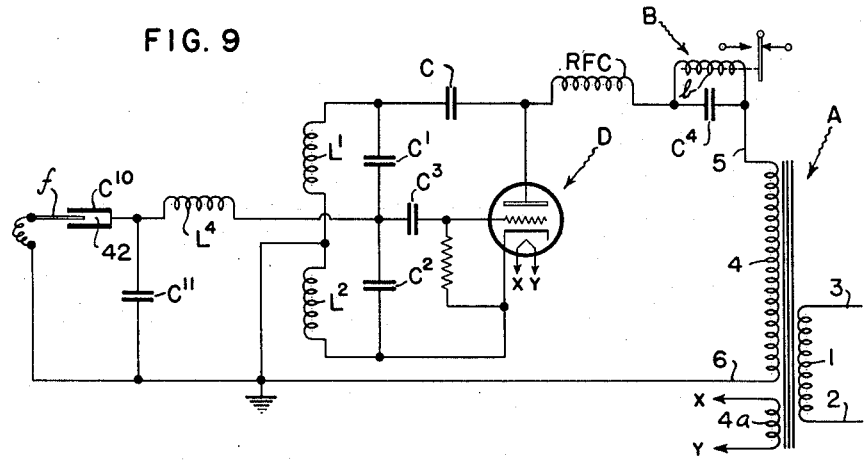

The oscillation controller shown in Fig. 9 is shunt fed, and is similar in various respects to the previously described controllers, but differs from each of the latter in the form of the control element, or variable reactance, through which the connected ends of the fixed inductors $L^1$ and $L^2$ are connected to the connected ends of the condensers $C^1$ and $C^2$. As shown, said control element of Fig. 9 comprises a variable condenser $C^{10}$ and a fixed inductor $L^4$. As shown, the condenser $C^{10}$ comprises two spaced apart plates, each of which is connected through the fixed inductor $L^4$ to the connected ends of the condensers $C^1$ and $C^2$. The condenser $C^{10}$ also comprises a plate $f$ which is movable into and out of the space 42 between the fixed plates of the condenser to thereby vary the condenser capacitance. The plate $f$ may be moved into and out of the space 42 by a control galvanometer, just as the galvanometer G of Fig. 2 moves the vane F into and out of the space 11 between the two sections of the variable inductor $L^3$. The relative tuning of the input and output circuits is similar to that described in connection with the Fig. 1 arrangement.

As shown, the variable condenser $C^{10}$ is connected in parallel with a fixed condenser $C^{11}$. The condenser $C^{11}$ increases the capacitance in series with the inductor $L^4$, but decreases the adjustment range or sensitivity of the variable reactance formed by the inductor $L^4$ and condensers $C^{10}$ and $C^{11}$. Functionally, however, the operation of the controller would not be modified if the condenser $C^{11}$ were omitted, and the capacitance and sensitivity of the condenser $C^{10}$ were modified to compensate for its omission.

In considering the operation of the controller shown in Fig. 9, it should be borne in mind that whether the oscillator is in its oscillating or its non-oscillating condition depends upon the total of the reactance of the control element, including the capacitive reactance of the condensers $C^{10}$ and $C^{11}$ and the inductive reactance of the inductor $L^4$. When this total reactance is sufficiently inductive or insufficiently capacitive, oscillation will occur, but when the total reactance is insufficiently inductive or overly capacitive, oscillation will cease. In other words, when $X_L$ represents the inductive reactance, and $X_C$ represents the capacitive reactance of the control element, whether oscillation will, or will not, occur depends upon the magnitude of the quantity $X_L - X_C$. In the Fig. 9 arrangement, the quantity $X_L$ is constant and the quantity $X_C$ is variable, and oscillation is initiated and interrupted by respectively decreasing and increasing the capacitive reactance $X_C$.

The effect of moving the plate $f$ into the space 42 is to increase the capacitance and to decrease the capacitive reactance of the control element. In consequence, oscillation is initiated and interrupted by moving the plate $f$ respectively into and out of the space 42. Thus, the controller shown in Fig. 9 is of the reverse type.

Figure 10:
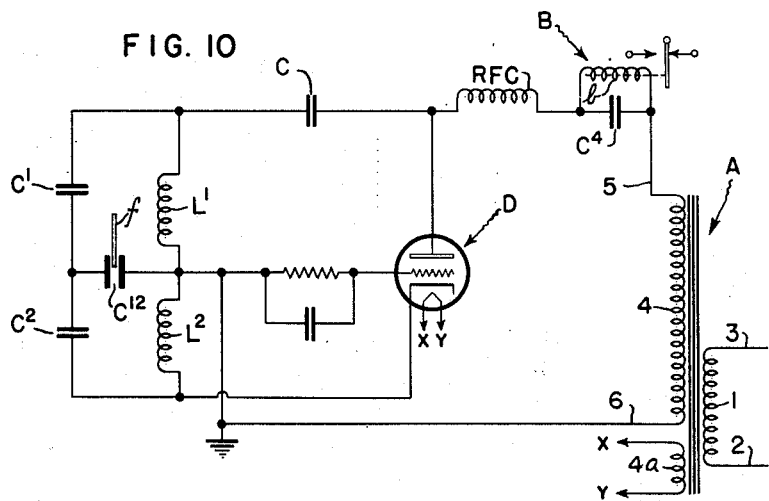

The oscillation controller shown in Fig. 10 differs essentially from that shown in Fig. 9 only in that its control element is purely capacitive and in that the relative tuning of the input and output circuits is similar to that described in the Fig. 6 arrangement. The control element of Fig. 10 is in the form of a variable resistor $C^{12}$ comprising a stationary plate connected to the connected ends of the fixed inductors $L^1$ and $L^2$, a second stationary plate connected to the connected terminals of the condensers $C^1$ and $C^2$, and a plate $f$ movable into and out of the space between the two spaced apart fixed plates of the condenser $C^{12}$. With the Fig. 10 arrangement, oscillation may be initiated by increasing the capacitive reactance of the condenser $C^{11}$ by withdrawing plate $f$. When the vane or plate $f$ is out of the space between the fixed condenser plates, the capacitance of the variable condenser is at a minimum and its capacitive reactance is at a maximum and oscillation will occur. Movement of the vane into the space betwen the fixed condenser plates increases the capacitance of the variable condenser and decreases its capacitive reactance and interrupts the oscillation. The oscillation controller of Fig. 10 is thus of the forward type. The oscillator shown in Fig. 10 is open to the practical objection that to obtain an adequate change in capacitance of the condenser $C^{12}$, the plate area of the plate $f$ must be larger than is ordinarily desirable. This disadvantage may be avoided by including both capacitance and inductance in the control element, as is done in Fig. 9 and as is also done in Fig. 11.

Figure 11:
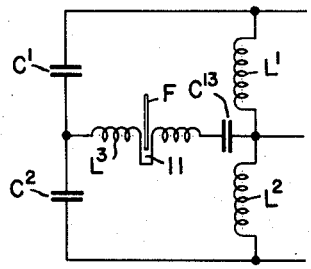

In the arrangement shown in Fig. 11, the control element comprises a variable inductor $L^3$ and a fixed condenser $C^{13}$. When the vane F enters the space 11 between the sections of the inductor $L^3$ of Fig. 11, the inductance and inductive reactance of the control element are decreased. Thus the controller shown in Fig. 11 is of the reverse type.

Fig. 12 illustrates an embodiment of the invention differing substantially from those previously described. The valve D is combined in Fig. 12 with a phase shifting triode valve HB arranged to amplify and produce a phase shift in the signal which is being transmitted to the control grid of the valve D. The anode of the valve HB is connected to the terminal 5 of the transformer winding 4 through an anode resistor 45. The cathode of the valve HB is connected to the grounded terminal 6 of the winding 4 by a cathode resistor 46 and a condenser $C^{14}$ in shunt therewith, and is connected to the control grid of the valve by a grid resistor 47. The winding 4 is shunted by an RF by-pass condenser $C^{15}$.

The control grid of the valve HB is connected through a condenser $C^3$ and fixed inductor $L^5$ to the oscillator circuit at a point 48 thereof to which one terminal of each of the condensers $C^1$ and $C^2$ and of each of the fixed inductors $L^1$ and $L^2$ is connected. The control grid of the valve HB is also connected to ground through the condenser $C^3$, a condenser $C^{16}$ and a variable inductor $L^3$. The inductor $L^3$ and the condenser $C^{16}$ are connected in series between ground and a point 49 to which the adjacent terminals of the inductor $L^5$ and condenser $C^3$ are connected. The anode of the valve HB is connected through a coupling condenser $C^{17}$ to the control grid of the valve D. The cathode of the valve D is directly connected to the grounded transformer terminal 6 and is connected to the control grid of the valve D by a grid resistor 50. The anode of the valve D is connected to an output circuit which can be traced from said anode through the parallel connected inductor $L^1$ and condenser $C^1$ to the point 48. The input circuit of the valve D can be traced from the cathode of the valve through the transformer terminal 6, transformer winding 4 and its by-pass condenser $C^{15}$, transformer terminal 5, relay winding $b$ and parallel condenser $C^4$, and the parallel connected inductor $L^2$ and condenser $C^2$ to the point 48. The two inductors $L^1$ and $L^2$ are arranged in mutual regenerative inductive relation.

The oscillation of the Fig. 12 oscillator is controlled by varying a regenerative feedback signal passing from the point 48 to the control grid of the valve D. That signal is varied by adjusting the vane F to vary the self-inductance of the variable inductor $L^3$. The vane F may be carried by the deflecting element of a galvanometer, as in Figs. 2 or 2A, or by some other instrument or device responsive to variations in a controlling condition. The adjustment of the vane F relative to the inductor $L^3$ of Fig. 12 varies the magnitude of the signal voltage impressed on the control grid of the valve HB. The inductor $L^5$, condenser $C^{16}$ and inductor $L^3$ which are connected in series between the point 48 and ground, may be regarded as forming a voltage divider.

The condenser $C^{16}$ and variable inductor $L^3$ are so related that when the vane F extends into the space 11 and thereby makes the inductive reactance of the inductor $L^3$ relatively small, relative to the capacitive reactance of the condenser $C^{16}$, the voltage between the point 49 and ground will be displaced approximately 180° in phase from the voltage between the point 48 and ground. The signal transmitted to the valve D through the condenser $C^{17}$ from the anode of the valve HB, is 180° out of phase with the signal impressed on the control grid of the valve HB. In consequence, the signal impressed on the control grid of the valve D will be approximately in phase with the voltage at the oscillator point 48 when the vane F extends into the space 11, and the oscillator of the Fig. 12 controller will then oscillate. When the vane F is moved out of the space 11 and the self-inductance of the inductor $L^3$ is correspondingly increased, the signal impressed on the control grid of the valve HB decreases and the signal fed back to the control grid of the valve D will not be sufficient to maintain the oscillator in operation.

The controller shown in Fig. 12 is of the reverse type, as its relay B is operatively energized only during periods in which the vane is not in the space 11 and the oscillator is not oscillating.

The controller shown in Fig. 13 comprises a circuit network very similar to that shown in Fig. 8, except in respect to the portion of the network in which the variable inductor $L^3$ is connected in series with a condenser $C^{18}$. In Fig. 13 the terminal of the condenser $C^{18}$ which is connected to the control grid of the valve D, is connected to ground, and thereby to the terminal 2 of the variable inductor $L^3$, through a radio frequency choke RFC and through a resistor 12 and a condenser $C^5$ in parallel with the last mentioned condenser. The condenser $C^{18}$ is so selected as to have a capacitive reactance approximating the inductive reactance of the inductor $L^3$. Thus, the condenser $C^{18}$ has a relatively high reactance as compared, for example, to the reactance of the condenser $C^3$ of Fig. 8.

The Fig. 13 arrangement illustrates a method of operating the oscillator without a degenerative mutual inductance coupling between the inductors $L^1$ and $L^2$. In Fig. 13, the capacitance $C^{18}$ in series with the variable or control inductor $L^3$, bucks out part of the inductive reactance of inductor $L^3$, in the same manner as would mutual degenerative inductance between the inductors $L^1$ and $L^2$. The condenser $C^{18}$ connected in series with the control inductor $L^3$, as shown in Fig. 13, provides compensation for stray inductance effects associated with the connections to the inductor $L^3$ and increases the sensitivity of operation. The radio frequency choke RFC prevents the condenser $C^5$ from effectively short circuiting the condenser $C^{18}$ and inductor $L^3$.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In an oscillator including an electronic valve having an anode, a cathode, a control grid, and tuned input and output circuits each including an inductive element individual to that circuit, the improvement consisting in a common variable reactive element connecting each of said inductive elements to said control grid and regulable to initiate and interrupt oscillation of the oscillator.

2. In an oscillator including an electronic valve having an anode, a cathode, a control-grid, and tuned input and output circuits each including an inductive element individual to that circuit, the improvement consisting in a common variable inductive element connecting each of the first mentioned two inductive elements to said control grid and regulable to initiate and interrupt oscillation of the oscillator.

3. In an oscillator including an electronic valve having an anode, a cathode, a control grid, and tuned input and output circuits each including an inductive element individual to that circuit, the improvement consisting in a common variable inductive element connecting each of the first mentioned two inductive elements to said control grid, and means for varying the inductive relation between different portions of said variable inductive element and thereby varying the self-inductance of the latter, whereby initiation and interruption of the oscillation of the oscillator are effected.

4. An oscillator comprising an electronic valve having an anode, a cathode, and a control grid, a tuned input circuit connected between said cathode and said control grid and including a first inductive element and a variable reactive element connected in series, first capacitive means connected in parallel with said series connected first inductive and variable reactive elements and operative to tune said input circuit to a predetermined frequency, a tuned output circuit connected between said anode and said control grid and including a second inductive element and said variable reactive element connected in series, second capacitive means connected in parallel with said series connected second inductive and variable reactive elements and operative to tune said output circuit to a predetermined frequency, said variable reactive element constituting a coupling means between said first and second inductive elements operative to feed back energy from said output circuit to said input circuit to an extent determined by the magnitude of the reactance of said variable reactive element, whereby the state of oscillation of the oscillator is determined by the magnitude of said reactance, and means operative to vary the magnitude of the reactance of said variable reactive element as required to initiate and interrupt oscillation of the oscillator.

5. An oscillator according to claim 4, wherein said variable reactive element is an inductive element.

6. An oscillator comprising an electronic valve having an anode, a cathode, and a control grid, a tuned input circuit connected between said cathode and said control grid and including a first inductive element and a variable reactive element connected in series, a condenser connected in parallel with said series connected inductive and variable reactive elements and operative to tune said input circuit to a predetermined frequency, a tuned output circuit connected between said anode and said control grid and including a second inductive element and said variable reactive element connected in series, a second condenser connected in parallel with said series connected second inductive and variable reactive elements and operative to tune said output circuit to a predetermined frequency, said variable reactive element constituting a coupling means between said first and second inductive elements operative to feed back energy from said output circuit to said input circuit to an extent determined by the magnitude of the reactance of said variable reactive element, whereby the state of oscillation of the oscillator is determined by the magnitude of said reactance, and means operative to vary the magnitude of the reactance of said variable reactance element as required to initiate and interrupt oscillation of the oscillator.

7. An oscillator comprising an electronic valve having an anode, a cathode, and a control grid, a tuned input circuit including an inductive element and a variable reactive element connected in series between said cathode and said control grid, a tuned output circuit including a second inductive element and said variable reactive element connected in series between said anode and said control grid, said variable reactive element being included in a circuit portion common to said input and output circuits and being regulable to initiate and interrupt oscillation of the oscillator, a by-pass condenser connected in series in said common portion and operative to isolate effectively said control grid from said anode and said cathode for unidirectional current flow, and a grid bias resistor connected between said control grid and said cathode.

8. An oscillator comprising an electronic valve having an anode, a cathode, and a control grid, a tuned input circuit including an inductive element and a variable reactive element connected in series between said cathode and a point in the oscillator, a tuned output circuit including a second inductive element and said variable reactive element connected in series between said anode and said point, said variable reactive element being regulable to initiate and interrupt oscillation of the oscillator, a grid bias resistor connected between said point and said control grid, and a by-pass condenser connected in parallel with said resistor and operative to by-pass around the latter currents of the frequency of operation of the oscillator.

9. An oscillator controller comprising an electronic valve having an anode, a cathode, and a control grid, a tuned input circuit connected between said cathode and said control grid and including an inductive element and a variable reactive element connected in series, a tuned output circuit connected between said anode and said control grid and including a second inductive element and said variable reactive element connected in series, said variable reactive element being regulable to initiate and interrupt oscillation of the oscillator, a pair of terminals adapted to be connected to a source of energizing current, a load circuit including conductors connecting said anode and said cathode to said terminals, whereby the energizing current which flows through said load circuit from the source is dependent in magnitude upon the degree of conductivity of said valve, and grid-cathode bias means connected between said control grid and said cathode and operative to vary the conductivity of said valve in accordance with the oscillation or non-oscillation of the oscillator, whereby the degree of energization of said load circuit is determined by the adjustment of said variable reactive element.

10. An oscillator controller comprising a first electronic valve having an anode, a cathode, and a control grid, a tuned input circuit connected between said cathode and said control grid and including an inductive element and a variable reactive element connected in series, a tuned output circuit connected between said anode and said control grid and including a second inductive element and said variable reactive element connected in series, said variable reactive element being regulable to initiate and interrupt oscillation of the oscillator, a pair of terminals adapted to be connected to a source of energizing current, a load circuit including conductors connecting said anode and said cathode to said terminals, grid-cathode bias means connected between said control grid and said cathode and operative to vary the conductivity of said valve in accordance with the oscillation or non-oscillation of the oscillator, whereby the energizing current which flows through said valve from the source is dependent in magnitude upon the adjustment of said variable reactive element, and a second electronic valve having an anode and a cathode connected in an output circuit energized from the source of energizing current and having a control grid included with the last mentioned cathode in an input circuit connected to said first valve and operative to control the conductivity of said second valve, whereby the magnitude of the energizing current which flows in the output circuit of said second valve from the source is controlled by said bias means.

11. An oscillator controller as specified in claim 10, wherein the control grid and the cathode of said second valve, included in the input circuit thereof, are respectively connected to the control grid and cathode of said first valve.

12. An oscillator controller as specified in claim 10, wherein the control grid and the cathode of said second valve, included in the input circuit thereof, are respectively connected to the control grid and cathode of said first valve, wherein there is provided a load device having an operating portion connected in series in said load circuit between the anode and cathode of said first valve and said terminals, and wherein there is included a signalling device connected in said output circuit of said second valve.

13. An oscillator controller as specified in claim 10, wherein said load circuit includes a load impedance connected in series between the anode and cathode of said first valve and said terminals, wherein the control grid and the cathode of said second valve, included in the input circuit thereof, are respectively connected to the opposite ends of said load impedance, and wherein there is provided a load device having an operating portion connected in series in the output circuit of said second valve between the anode and cathode thereof and the source of energizing current.

14. An oscillator controller comprising an electronic valve having an anode, a cathode, and a control grid, a tuned input circuit connected between said cathode and said control grid and including a first inductive element connected at one end to said cathode and at the remaining end to a point in the oscillator, a variable reactive element, a first by-pass condenser connected between said point and one end of said reactive element, a conductive connection between the remaining end of the latter and said control grid, and a first tuning condenser connected between said cathode and said control grid, a tuned output circuit connected between said anode and said control grid and including a second inductive element connected at one end to said anode and at the remaining end to one end of a load device, a second by-pass condenser connected between the last mentioned end and said point, whereby said anode is connected through said second inductive element, said second by-pass condenser, said first by-pass condenser, said reactive element, and said conductive connection to said control grid, and a second tuning condenser connected between said anode and said control grid, a pair of terminals adapted to be connected to a source of energizing current, a conductive connection between one of said terminals and the remaining end of said load device, a conductive connection between the other of said terminals and said point, and a grid-cathode bias resistor connected between said control grid and said point, said variable reactive element being regulable to initiate and interrupt oscillation of the oscillator and hence to control the magnitude of the current which flows through said load device from the source.

15. An oscillator controller as specified in claim 14, wherein said variable reactive element comprises an inductive element and a movable metallic member cooperating therewith and operative when moved to different positions relative to the last mentioned inductive element to vary the self-inductance of the latter and hence to initiate and interrupt oscillation of the oscillator, and wherein there is included a second electronic valve having an anode, a cathode, and a control grid, a connection between the last mentioned and the first mentioned control grids, a connection between the last mentioned cathode and said other of said terminals, and a connection including a signalling device connected between the last mentioned anode and said one of said terminals.

16. An oscillator controller as specified in claim 14, wherein said variable reactive element comprises an inductive element and a movable metallic member cooperating therewith and operative when moved to different positions relative to the last mentioned inductive element to vary the self-inductance of the latter and hence to initiate and interrupt oscillation of the oscillator, and wherein there is included a second electronic valve having an anode, a cathode, and a control grid, a direct connection between the last mentioned and the first mentioned control grids, a direct connection between the last mentioned cathode and said other of said terminals, a load resistor connected between the last mentioned anode and said one end of said load device, a timing condenser and a timing resistor connected in series between said last mentioned anode and said one of said terminals, and a glow-discharge signal lamp connected across said timing condenser.

17. An oscillator controller as specified in claim 14, wherein said variable reactive element comprises an inductive element and a movable metallic member cooperating therewith and operative when moved to different positions relative to the last mentioned inductive element to vary the self-inductance of the latter and hence to initiate and interrupt oscillation of the oscillator, wherein said load device comprises a load impedance, and wherein there is included an electronic valve having an anode, a cathode, and a control grid, an input circuit including the last mentioned cathode and control grid connected across said load impedance, and an output circuit including the last mentioned anode and said last mentioned cathode connected between said terminals, the last mentioned output circuit being operative to assume one condition when said member adjusts the self-inductance of the last mentioned inductive element to a value at which oscillation of the oscillator is initiated, and being operative to assume a second condition when said member adjusts the self-inductance of said last mentioned inductive element to a value at which oscillation of the oscillator is interrupted.

18. An oscillator controller as specified in claim 14, wherein said variable reactive element comprises an inductive element and a movable metallic member cooperating therewith and operative when moved to different positions relative to the last mentioned inductive element to vary the self-inductance of the latter and hence to initiate and interrupt oscillation of the oscillator, wherein said load device comprises a load impedance, and wherein there is included a second electronic valve having an anode, a cathode, and a control grid, a connection including an impedance connected between the last mentioned control grid and said one end of said load device, a third terminal adapted to be connected to the source of energizing current at a point intermediate in potential relative to said pair of terminals, a connection between the last mentioned cathode and said third terminal, and an output connection connected between the last mentioned anode and said one of said terminals, said output connection being operative to assume one condition when said member adjusts the self-inductance of said last mentioned inductive element to a value at which oscillation of the oscillator is initiated, and being operative to assume a second condition when said member adjusts the self-inductance of said last mentioned inductive element to a value at which oscillation of the oscillator is interrupted.

19. In an oscillator including an electronic valve having an anode, a cathode, a control grid, and tuned input and output circuits each including an inductive element individual to that circuit, the improvement consisting in a common variable capacitive element connecting each of said inductive elements to said control grid and regulable to initiate and interrupt oscillation of the oscillator.

20. In an oscillator including an electronic valve having an anode, a cathode, a control grid, and tuned input and output circuits each including an inductive element individual to that circuit, the improvement consisting in a degenerative magnetic coupling between said inductive elements, and a common variable reactive element connecting each of said inductive elements to said control grid and regulable to initiate and interrupt oscillation of the oscillator.

21. In an oscillator including an electronic valve having an anode, a cathode, a control grid, and tuned input and output circuits each including an inductive element individual to that circuit, the improvement consisting in a regenerative magnetic coupling between said inductive elements, and a common variable reactive element connecting each of said inductive elements to said control grid and regulable to initiate and interrupt oscillation of the oscillator.

22. An oscillator controller comprising an electronic valve having an anode, a cathode, and a control grid, a tuned input circuit connected between said cathode and said control grid and including a first inductive element connected at one end to said cathode, a variable inductive element connected at one end to the remaining end of said first inductive element and connected at its remaining end to a point in the oscillator, a grid-cathode bias resistor connected between said point and said control grid, and a first tuning condenser connected between said cathode and said point, a first by-pass condenser connected in parallel with said bias resistor, a tuned output circuit connected between said anode and said control grid and including a second inductive element arranged in regenerative magnetic coupling relation to said first inductive element and connected at one end to said one end of said variable inductive element, a second by-pass condenser connected between the remaining end of said second inductive element and said anode, and a second tuning condenser connected between said anode and said point, a pair of terminals adapted to be connected to a source of energizing current, a conductive output connection between one of said terminals and said anode, and a conductive connection between the other of said terminals and said point, said variable inductive element being regulable to initiate and interrupt oscillation of the oscillator and hence to control the magnitude of the current which flows through said conductive output connection from the source.

23. In an oscillator including a portion in which variation in a characteristic thereof controls the oscillatory state of the oscillator and including a load device actuated in accordance with the oscillatory state of the oscillator, the improvement which consists of a flat, elongated spiral coil included in said portion, and a metallic vane movable adjacent and relative to said coil.

24. In an oscillator including a portion in which variation in a characteristic thereof controls the oscillatory state of the oscillator and including a load device actuated in accordance with the oscillatory state of the oscillator, the improvement which consists of a pair of flat, elongated spiral coils included in said portion and lying in adjacent planes, and a metallic vane movable relative to said coils in a plane between the latter.

25. In an oscillator including a portion in which variation in the inductance thereof controls the oscillatory state of the oscillator and including a load device actuated in accordance with the oscillatory state of the oscillator, the improvement which consists of a variable inductive element included in said portion and consisting of at least two serially-connected sections lying in substantially parallel planes, each of said sections being in the form of an elongated, flat spiral coil having substantially parallel sides, and a metallic vane movable in a plane between said sections and operative when moved to different positions between and relative to said sections to vary the extent to which said vane shields each of said sections from an adjacent one thereof and hence to vary the self-inductance of said variable inductive element and to control the oscillatory state of the oscillator.

26. In an oscillator including a portion in which variation in the inductance thereof controls the oscillatory state of the oscillator and including a load device actuated in accordance with the oscillatory state of the oscillator, the improvement which consists of a flat, elongated spiral coil included in said portion, and a metallic vane movable relative to said coil in a plane adjacent thereto and operative when moved to different positions relative to said coil to vary the self-inductance thereof and hence to control the oscillatory state of the oscillator.

27. In an oscillator including an electronic valve having an anode, a cathode, a control grid, and tuned input and output circuits each including an inductive element individual to that circuit, the improvement consisting in a variable inductive element connected in a circuit which is common to said input and output circuits and comprising a flat, elongated spiral coil included in said common circuit, and a metallic vane movable relative to said coil in a plane adjacent thereto and operative when moved to different positions relative to said coil to vary the self-inductance thereof to control the oscillatory state of the oscillator.

28. An oscillator controller comprising an electronic valve having an anode, a cathode, and a control grid, a tuned input circuit connected between said cathode and said control grid and including a first inductive element connected at one end to said cathode and at the remaining end to a point in the oscillator, a variable inductive element, a first by-pass condenser connected between said point and one end of said variable inductive element, a conductive connection between the remaining end of the latter and said control grid, and a first tuning condenser connected between said cathode and said control grid, a tuned output circuit connected between said anode and said control grid and including a second inductive element connected at one end to said anode and having a remaining end, a second by-pass condenser connected between the last mentioned end and said point, whereby said anode is connected through said second inductive element, said second by-pass condenser, said first by-pass condenser, said variable inductive element, and said conductive connection to said control grid, and a second tuning condenser connected between said anode and said control grid, a pair of terminals adapted to be connected to a source of energizing current, a conductive load connection between one of said terminals and the remaining end of said second inductive element, said load connection being operable into one condition when said oscillator is oscillating, and being operable into a second condition when oscillation of said oscillator is interrupted, a conductive connection between the other of said terminals and said point, and a grid-cathode bias resistor connected between said control grid and said point, said variable inductive element consisting of at least two serially-connected sections lying in substantially parallel planes, each of said sections being in the form of an elongated, flat spiral coil having substantially parallel sides, and a metallic vane movable in a plane between said sections and operative when moved to different positions between and relative to said sections to vary the extent to which said vane shields each of said sections from an adjacent one thereof and hence to vary the self-inductance of said variable inductive element and to control the oscillatory state of the oscillator and the condition of said load connection.

WARREN MOORE, Jr.

References Cited in the file of this patent

UNITED STATES PATENTS

| Number | Name | Date |
|---|---|---|
| 2,093,416 | Case | Sept. 21, 1937 |
| 2,154,260 | Brandenburger | Apr. 11, 1939 |
| 2,411,247 | Cohen | Nov. 19, 1946 |
| 2,505,577 | Rich | Apr. 25, 1950 |
| 2,531,313 | Wannamaker | Nov. 21, 1950 |
| 2,584,728 | Michel | Feb. 5, 1952 |